United States Patent [19]

Lampman et al.

[11] Patent Number: 4,767,437
[45] Date of Patent: Aug. 30, 1988

[54] HORIZONTAL PRESS BENDING USING A SPLITTING VACUUM/PRESSURE PICKUP

[75] Inventors: DeWitt W. Lampman, Hampton Township, Allegheny County; George R. Claassen, New Kensington; Michael T. Fecik, Pittsburgh, all of Pa.

[73] Assignee: PPG Industries, Inc., Pittsburgh, Pa.

[21] Appl. No.: 30,022

[22] Filed: Mar. 25, 1987

[51] Int. Cl.$^4$ .......................................... C03B 23/033
[52] U.S. Cl. ...................................... 65/104; 65/106; 65/107; 65/273; 65/287
[58] Field of Search ................ 65/104, 106, 107, 273, 65/287

[56] References Cited

U.S. PATENT DOCUMENTS

| | | |
|---|---|---|
| 3,223,443 | 12/1965 | Misson . |
| 4,227,908 | 10/1980 | Seymour . |
| 4,229,199 | 10/1980 | Seymour . |
| 4,229,200 | 10/1980 | Seymour . |
| 4,233,049 | 11/1980 | Seymour . |
| 4,265,650 | 5/1981 | Reese et al. . |
| 4,280,828 | 7/1981 | Seymour . |
| 4,282,026 | 8/1981 | McMaster et al. . |
| 4,297,118 | 10/1981 | Kellar et al. . |
| 4,361,432 | 11/1982 | McMaster et al. . |
| 4,437,871 | 3/1984 | McMaster et al. . |
| 4,437,872 | 3/1984 | McMaster et al. . |
| 4,508,556 | 4/1985 | Bennett et al. . |
| 4,517,001 | 5/1985 | McMaster . |
| 4,526,605 | 7/1985 | Frank et al. . |
| 4,578,103 | 3/1986 | Fackelman . |
| 4,579,577 | 4/1986 | Claassen . |
| 4,615,724 | 10/1986 | Fackelman . |

*Primary Examiner*—Arthur Kellogg
*Attorney, Agent, or Firm*—Andrew C. Siminerio

[57] ABSTRACT

A horizontal press bending arrangement for press bending heat softened glass sheets during transfer into a shaping station. The glass sheet is conveyed through a roller hearth or gaseous support hearth type furnace to heat the sheet to its heat deformable temperature. The sheet is then transferred beneath a vacuum/pressure pick-up to support the glass sheet in non-engaging contact therewith. The sheet is next deposited on a lower mold. The vacuum/pressure pick-up thereafter splits in two and moves out of the shaping station to allow the sheet to be shaped between a pair of vertically aligned shaping molds. After shaping the shaped sheet is removed for further processing, e.g., tempering.

30 Claims, 7 Drawing Sheets

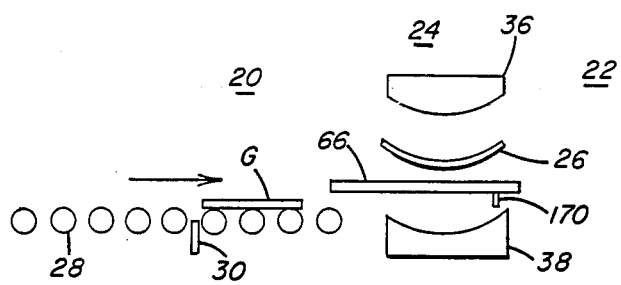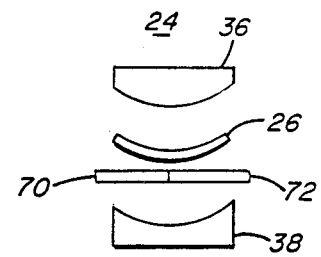
FIG. 9  FIG. 10
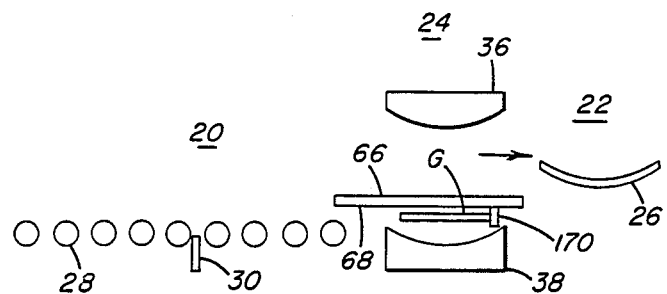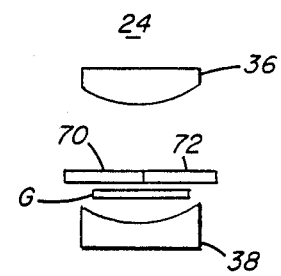
FIG. 11  FIG. 12
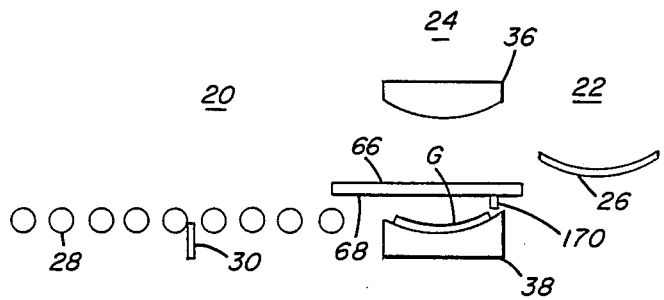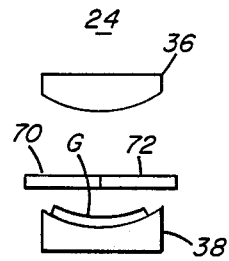
FIG. 13  FIG. 14
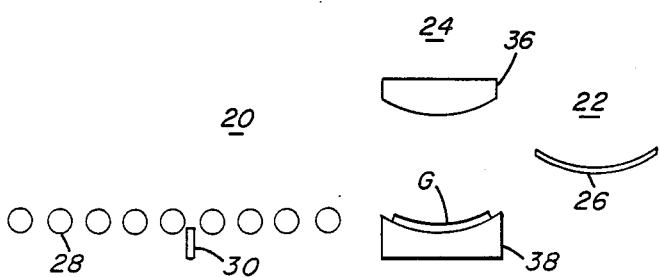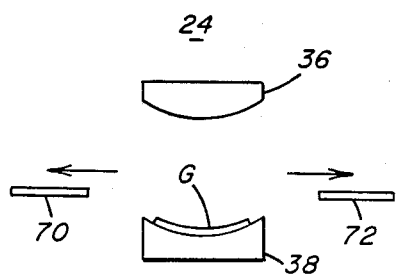
FIG. 15  FIG. 16

HORIZONTAL PRESS BENDING USING A SPLITTING VACUUM/PRESSURE PICKUP

BACKGROUND OF THE INVENTION

1. Field of the Invention

This invention relates to the handling of glass sheets and, in particular, to a horizontal press bending arrangement wherein heat softened glass sheets are transferred into a shaping station and deposited between a pair of vertically aligned, full surface shaping molds without contacting the upper major surface of the heat softened glass sheet.

2a. Technical Considerations

Shaped glass sheets are widely used as windows in vehicles such as automobiles and the like. The glass sheets are generally heat strengthened, i.e., annealed or tempered depending upon the desired use of the window in the vehicle. To be suitable for such applications, flat glass sheets must be shaped to precisely defined curvatures dictated by the shape and outline of the framing defining the window opening in the vehicle. It is also important that the windows meet stringent optical requirements so that the windows are free of optical defects that would tend to interfere with the clear viewing through the viewing area.

The commercial production of shaped glass sheets for such purposes commonly includes heating flat glass sheets to their heat softening temperature, shaping the heated glass to a desired curvature, and cooling the shaped glass in a controlled manner to a temperature below the strain point temperature of the glass, e.g., tempering to strengthen the glass and increase its resistance to damage resulting from impact. During such an operation, a glass sheet is generally conveyed along a substantially horizontal path that extends through a tunnel-type furnace. The glass sheet is one of a series of sheets and is heated to its heat softening temperature. The glass sheet is then transferred, for example, by a vacuum pick-up and shuttle arrangement, to a shaping station adjacent the furnace where the glass sheet is by press bending, sag bending, or other well known glass shaping After shaping, a transfer and tempering ring conveys the shaped glass sheet into a cooling station for rapid cooling.

Other shaping operations employ the use of a stationary transfer platen that supports the heat softened glass sheets from above without contacting the glass sheet and a shuttling shaping ring arrangement. The lower facing surface of the platen includes two sets of holes: one set of holes pulls a vacuum along the facing surface to draw the glass towards the platen and a second set of holes provides pressurized gas along the facing surface to prevent the glass from contacting the platen. An open center shaping ring is positioned below the platen to receive the glass. After vacuum is terminated, the glass sheet drops onto the ring to shape the glass by gravity. The ring with the glass sheet supported thereon, moves from beneath the platen into a cooling station.

An advantage in using a non-glass surface contacting transfer arrangement is that it reduces the incidents of scratching and/or marring during transfer from the furnace to the heating station. In addition, in instances where the glass sheet includes a ceramic border or some other type of added surface pattern on its upwardly facing major surface, the glass sheet can be transferred to the shaping station without contacting the coated major surface and possibly rubbing or scuffing the pattern such that the glass part is defective or optically unacceptable.

As automotive stylists strive to provide more aerodynamic vehicle designs, the bent shapes of the glass sheets are becoming increasingly more complex. These shapes that include configurations that cannot be achieved by using conventional sag bending techniques, such as reverse curvatures and small radius bends, require tight dimensional and contour tolerances. In order to repeatedly and effectively produce these complex configurations, full surface bending molds have been used.

It would be advantageous to provide a glass sheet handling and shaping arrangement wherein the glass sheets have minimal surface contact with the heating and conveying operation and the sheets can be shaped to complex configurations.

2b. Patents of Interest

U.S. Pat. No. 3,223,443 to Misson teaches a glass sheet handling apparatus for supporting glass sheets heated to their heat deformation temperature without distorting or marring the glass sheet surface. The sheet is supported from above by a holder that establishes a pressure and exhaust zone between the upper surface of the sheet and the lower surface of the holder. A net pressure differential is established above the sheet which is less than the ambient pressure by an equal amount to the weight of the glass sheet. As a result, the glass sheet is supported by, but floats below, the lower surface of the holder.

U.S. Pat. Nos. 4,578,103 and 4,615,724 to Fackelman teach the combination of a glass sheet heating conveyer, a top-side transfer apparatus, similar to that taught in Misson, to support the heat softened glass sheet, and a curved outline mold positioned below the holder to receive the heat softened glass sheet from the transfer apparatus for forming. The transfer apparatus includes holes to draw a vacuum at the face of the apparatus and holes to provide pressurized gas along the face of the apparatus. The holes may be inclined so as to help move the supported glass sheet along the lower surface of the apparatus. The glass sheet is dropped onto an open center shaping ring, wherein it deforms by gravity to conform to the peripheral configuration of the ring. In U.S. Pat. No. 4,578,103, the glass sheet is conveyed off of the conveyor rolls and directly beneath the transfer apparatus. The transfer ring is moved below the top side transfer apparatus to receive the heat softened glass sheet for sag bending. In U.S. Pat. No. 4,615,724, the transfer apparatus engages the glass sheet while the glass is supported on the heating conveyor and moves vertically upward to allow the shaping ring to be positioned under the supported glass sheet.

U.S. Pat. Nos. 4,282,026; 4,361,432; 4,437,871; and 4,437,872 to McMaster et al. each teach a drop forming apparatus wherein a hot glass sheet is engaged within a heating furnace by a stationary upper vacuum pick-up positioned above the furnace conveying rolls and subsequently is deposited on a shuttling carrier mold ring. The downwardly facing surface of the vacuum pick-up can be planar or curved. The pick-up can reciprocate vertically to engage the glass, or auxiliary lifters can be positioned between the furnace rolls and beneath the hot glass sheet to lift the glass for engagement with the vacuum pick-up. The ring moves beneath the vacuum supported glass sheet and the vacuum is terminated to drop the hot glass sheet on the ring and effect shaping. The ring subsequently shuttles from its pick-up transfer station to a quench unit that rapidly cools the shaped glass. Throughout the operation, the vacuum pick-up remains horizontally stationary within the furnace and the glass is transferred directly to a movable ring mold.

U.S. Pat. Nos. 4,227,908; 4,229,199; 4,229,200; 4,233,049; and 4,280,828 to Seymour teach shaping glass sheets by drop forming. A heat softened glass sheet exits a furnace and is positioned on a support bed below a stationary flat vacuum pick-up. The pick-up lifts the glass sheet and moves upward to allow a contoured shaping ring to be positioned under the sheet. Vacuum is disengaged and the sheet drops on the ring. The force generated by the impact of the glass sheet on the ring provides the bending force required to shape the sheet and conform it to the desired configuration.

U.S. Pat. No. 4,297,118 to Kellar et al. teaches a shuttling deformable vacuum mold that engages a heated glass sheet within a heating furnace. While still in the furnace, the mold deposits the shaped glass sheet on a shuttling tempering ring that is positioned beneath the mold. After depositing the glass, the vacuum mold shuttles to a position outside of the furnace to cool prior to reentering the furnace to engage the next glass sheet. The tempering ring transfers the glass sheet from the furnace to a quenching station to temper the glass.

U.S. Pat. No. 4,517,001 to McMaster teaches the use of a traveling vacuum holder with a downwardly facing engaging surface to lift a heated glass sheet and transfer the sheet onto a carrier ring mold within the heating furnace wherein the heated glass sheet is bent under the force of gravity on the mold. The bent glass sheet is subsequently removed from the furnace to a quench unit to temper the bent glass.

SUMMARY OF THE INVENTION

An object of the present invention is to provide a glass sheet shaping apparatus that includes a glass sheet transfer arrangement that transfers the heat softened glass sheets from a heating furnace to a shaping station with minimal glass sheet contact. The transfer arrangement includes a movable vacuum/pressure pick-up with a downwardly facing glass sheet supporting surface. The pick-up includes a first set of openings extending from the supporting surface through the pick-up to a pressurized gas chamber to direct pressurized gas to the supporting surface and a second set of openings extending from the supporting surface through the pick-up to a vacuum chamber to draw a vacuum along the supporting surface. With this arrangement, the pick-up supports the heat softened glass sheet by vacuum from above while the pressurized gas prevents contact between the glass sheet and the supporting surface of the pick-up. The pick-up further includes a shuttling frame that moves the pick-up from a first position between a pair of vertically aligned upper and lower shaping molds at a shaping station to a second position adjacent the molds. The glass sheets are conveyed directly from the furnace into non-engaging contact with the pick-up while the pick-up is in its first position. The pick-up deposits the glass sheet onto the lower mold and moves to its second position so that the mold may move vertically towards each other and shape the glass sheet by sandwiching it between their respective shaping surfaces.

In one particular embodiment of the invention, the pick-up is a splitting vacuum/pressure pick-up with first and second portions supported on separate shuttling frames that move the pick-up portions in opposite directions, perpendicular to the direction in which the glass sheet is conveyed into the shaping station. Each of the frames includes a first set of interconnected support tubes having a first enclosed passageway connected to the first set of openings in the pick-up and a second set of interconnecting support tubes having a second enclosed passageway connected to the second set of openings. Pressurized gas and vacuum sources are connected to each frame outside of the shaping station such that each is supplied to the pick-up supporting surface through the first and second enclosed passageways, respectively.

Another object of this invention is to provide a method of shaping a glass sheet. The glass sheet is heated to its heat softening temperature, transferred to a movable holder positioned between a pair of vertically aligned upper and lower shaping molds within a shaping station while in non-contacting engagement therewith, and deposited on the lower shaping mold. The holder then moves from a first position between the molds to a second position adjacent to the molds. The glass sheet is then pressed between the molds. The glass sheet is supported in non-contacting engagement with the holder by drawing a vacuum through a downwardly facing surface of the holder while providing pressurized gas along the surface such that the vacuum draws the heat softened glass sheet towards the holder to support the glass sheet while the pressurized gas maintains a cushion of gas between the upper major surface of the glass sheet and the surface of said holder.

In one particular embodiment of the invention, the holder separates into two holder portions with each portion moving in opposite directions as said holder moves from the first position to the second position.

BRIEF DESCRIPTION OF THE DRAWINGS

FIGS. 9 through 24 are schematic elevational and end views illustrating the operating sequence of the present invention.

DETAILED DESCRIPTION OF THE INVENTION

The present invention is presented with respect to shaping and tempering of glass sheets, but it should be appreciated that the invention may be used in other shaping arrangements and/or other sheet transfer operations that require minimal contact between the transfer apparatus and the sheet material.

Figure 1:
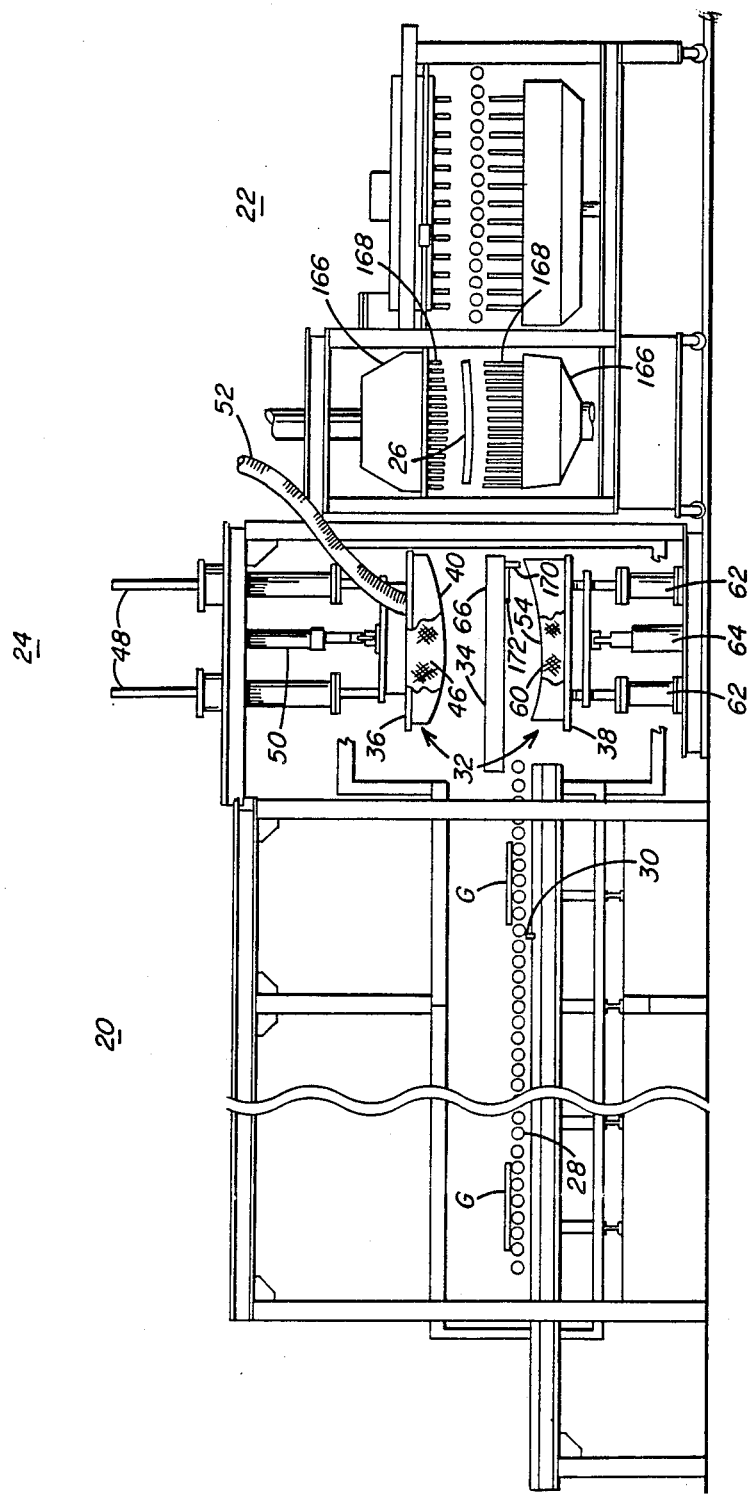
FIG. 1 is an elevational view of the glass sheet transfer and shaping arrangement of the present invention.

Referring to FIG. 1, an apparatus for heating, handling and shaping sheets of material, such as glass, includes a furnace 20 through which the sheets of glass G are conveyed while being heated to their heat deformation temparature. A cooling station 22 for cooling the curved glass sheets and an unloading station (not shown), located beyond the cooling station 22, are positioned to the right of the furnace 20 as seen in FIG. 1. A shaping station 24 is positioned between the furnace 20 and the cooling station 22. A sheet transfer device 26 located at the cooling station 22 transfers the shaped glass sheets from the shaping station 24 to the cooling station 22.

Figure 2:
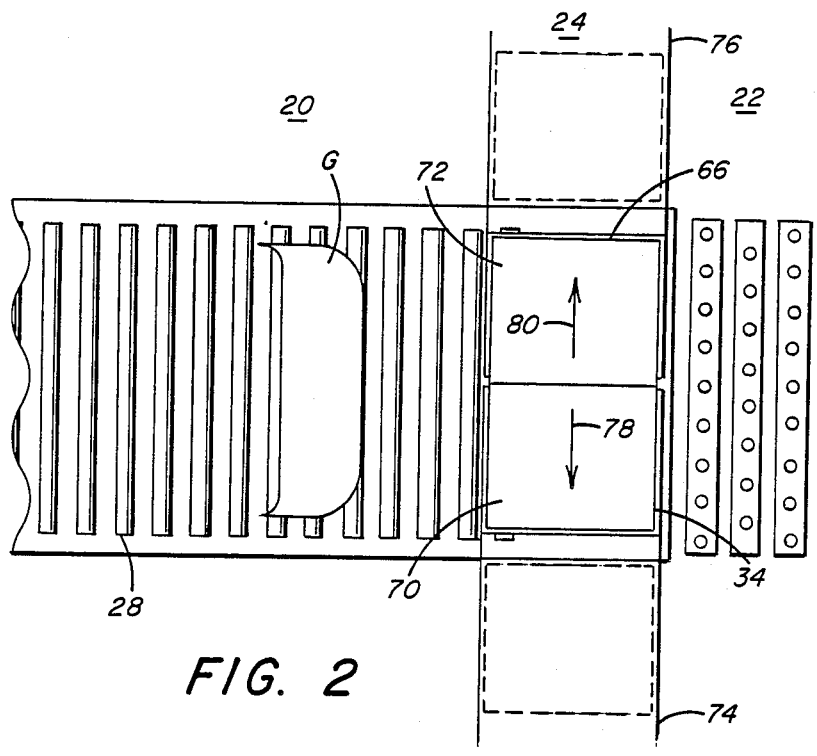
FIG. 2 is a schematic top view of the glass sheet transfer arrangement shown in FIG. 1 showing the splitting vacuum/pressure pick up of the present invention at the shaping station.

Heat may be supplied to the furnace 20 in any convenient manner, for example, from gas burners or by electrical radiant heaters or by a combination of both, which heat supplying means are well known in the art. In the particular embodiment illustrated in FIGS. 1 and 2, the furnace 20 includes a horizontal conveyor having longitudinally spaced, transversely extending conveyor rolls 28 that define a path of travel which extends through the furnace 20. The conveyor rolls 28 may be arranged in sections so that the speed of different conveyor sections may be controlled and synchronized, in a manner well known in the art, for proper movement and positioning of the glass sheet through the furnace 20. It should be appreciated that although FIGS. 1 and 2 illustrate a furnace including conveyor rolls, the furnace 20 is not meant to be so limited, and, as an alternative, may include a gaseous hearth support and conveying arrangement as disclosed in U.S. Pat. No. 4,508,556 to Bennett et al., which teachings are hereby incorporated by reference. With a gaseous hearth support and conveying arrangement, there will be minimal contact between the conveyed glass sheet and the gaseous hearth support as the glass sheet is conveyed thereover. A glass sensing member 30 (shown only in FIG. 1) is located within the furnace 20 to initiate a transfer and shaping operating cycle as will be discussed later.

The shaping station 24 includes a pair of vertically aligned pressing molds 32. It should be appreciated that if it is required that the shaping station 24 be heated, it may be included within the furnace 20 or in a separately heated chamber as shown in FIG. 1.

A transfer device 34, which is the object of this invention, engages the heat softened glass sheet G within the furnace and transfers it into the shaping station 24 where the glass sheet G is positioned and deposited between the molds 32 for subsequent shaping, as will be discussed later in more detail.

Figure 3:
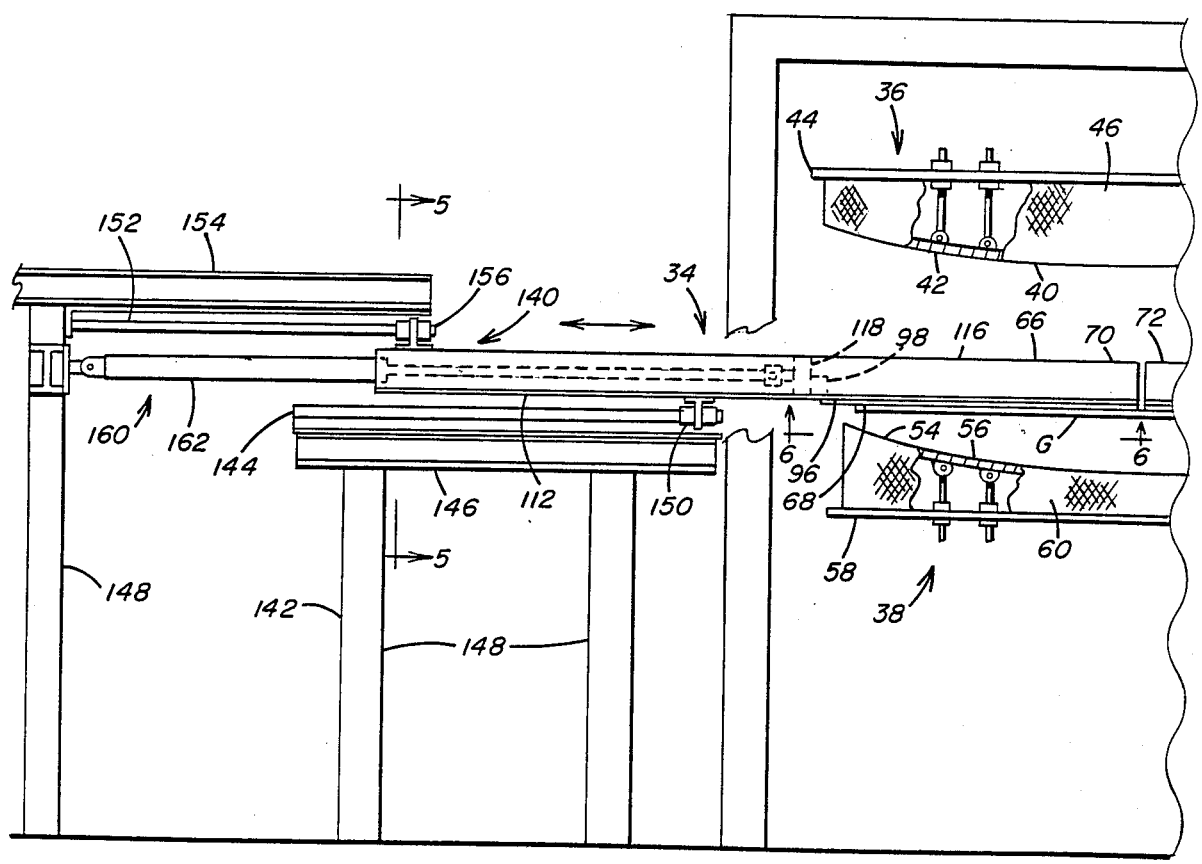
FIG. 3 is a partial end view of the particular embodiment of the invention shown in FIGS. 1 and 2.

The shaping molds 32 include an upper full surface vacuum mold 36 and a lower mold 38. The upper mold 36 includes a downwardly facing press face 40 that conforms to the final desired configuration of the glass sheet G to be shaped. Although not limiting in the present invention, the upper mold 36 may be similar in construction to that disclosed in U.S. Pat. No. 4,579,577 to Claassen, which teachings are hereby incorporated by reference. Referring to FIG. 3, the press face 40 of the upper mold 36 may be an apertured flexible metal wall 42 constructed from any flexible heat resistance material, e.g., steel, which is adjustably connected to an upper mounting plate 44. The upper mold 36 may be covered with a refractory cloth cover 46, such as fiber glass, to insulate the glass from the mold. The cover 46 is drawn across the apertured press face 40 and secured to mounting plate 44 in any convenient fashion, e.g., clamps.

Referring to FIG. 1, the upper mold 36 is suitably connected through upper vertical guides 48 to an upper support frame and is movable relative thereto by an upper piston 50. The upper vacuum mold 36 communicates with a vacuum source (not shown) through an evacuation line 52. The source of the vacuum and the valves for the vacuum may be synchronized according to a predetermined timing cycle as will be discussed later.

The press face 40 may also include pivoting wing sections (not shown) to provide additional shaping capabilities, especially in shapes requiring severe wrap configurations.

It can be appreciated by one skilled in the art that the mold construction as described, supra, is not necessarily so limited and that alternate mold constructions may be used for the upper mold 36. Such a construction would include materials that provide and maintain a smoothly surfaced contour and good durability despite intermittent contact with hot glass which causes rapid cyclic temperature variations over an extended period of time. Although not limiting in the present invention, alternate configurations of the upper mold 36 may be constructed in a manner similar to those disclosed in U.S. Pat. Nos. 4,265,650 to Reese et al and 4,526,605 to Frank et al, which teachings are hereby incorporated by reference. In particular, the upper mold 36 may include an apertured ceramic press face (not shown) and an enclosed interior vacuum chamber secured to an upper mounting plate.

As shown in FIGS. 1 and 3, the lower mold 38 is a full surface mold with an upwardly facing press face 54 that compliments the surface of the press face 40 of the upper mold 36. The lower mold 38 may be constructed in a manner similar to that of the upper mold 36, as described supra. Referring specifically to FIG. 3, an imperforate, flexible wall member 56 is adjustably connected to a mounting plate 58, so as to provide for adjustment of the surface contours of the press face 54. The lower mold 38 is covered with a refractory cloth 60, such as fiber glass, to insulate the glass from the mold. Referring to FIG. 1, the mounting plate 58 is suitably connected through lower vertical guides 62 to a support frame and is movable relative thereto by a lower piston 64.

As an alternative, the lower mold 38 may be constructed in a manner similar to that discussed, supra, with respect to the upper mold 36. In particular, the lower mold 38 may include a ceramic press face (not shown) secured to a lower mounting plate. In addition, it is contemplated that the forming operation may incorporate a lower mold 38 similar to that disclosed in U.S. Pat. No. 4,508,556 to Bennett et al. In particular, the lower mold 42 would include an auxiliary gaseous hearth support bed (not shown) surrounded by a lower ring-type mold (not shown). The lower ring mold lifts the glass off the auxiliary support bed upon which it is supported and presses it against the press face 40 of the upper mold 38.

It should be appreciated to those skilled in the art that although in the preferred embodiment of the invention, lower mold 38 is a full surface shaping mold, as an alternative the lower mold may be outline shaping ring having a shape and elevational configuration corresponding to the outline of the glass sheet to be shaped slightly inboard of the glass sheet periphery.

The transfer device 34 is used to transfer the heat softened glass sheets from the furnace 20 to a position between the molds 32, wherein the glass sheet G is thereafter deposited on the lower mold 38 for subsequent press bending. In the preferred embodiment of the invention illustrated in FIGS. 1-8, the device 34 is a splitting vacuum pressure pick-up 66 with a generally planar lower face 68 which supports the heat softened glass sheet from above without directly contacting the upper major surface of the glass sheet G.

Referring to FIG. 2, the splitting vacuum pressure pick-up 66 includes pick-up portions 70 and 72 slidably mounted on independent slide assemblies 74 and 76, respectively. As shown in FIG. 1, the pick-up 66 is positioned at the exit end of the furnace 20 within the shaping station 24 with its lower face 68 positioned slightly above the conveying surface of the rolls 28 and between the vertically aligned molds 32. As will be discussed later in more detail, the heat softened glass sheet G is conveyed off of the rolls 28 at the exit end of the furnace 20 and directly into supporting engagement with the pick-up 66. When the glass sheet G is properly aligned on the pick-up 66, the pick-up 66 splits, with portions 70 and 72 moving in opposite directions as indicated in FIG. 2 by arrows 78 and 80, respectively, so that the glass sheet G is deposited on the lower mold 38 (not shown in FIG. 2). If desired, the vacuum pressure pick-up 66 may extend over several of the conveying rolls 28 at the exit end of the furnace 20 to insure a proper transfer from the rolls 28 to the pick-up 66.

The following discussion will be directed towards the pick-up portion 70 and slide assembly 74, but it is understood that the pick-up portion 72 and slide assembly 76 are constructed and operated in a similar manner.

Figure 6:
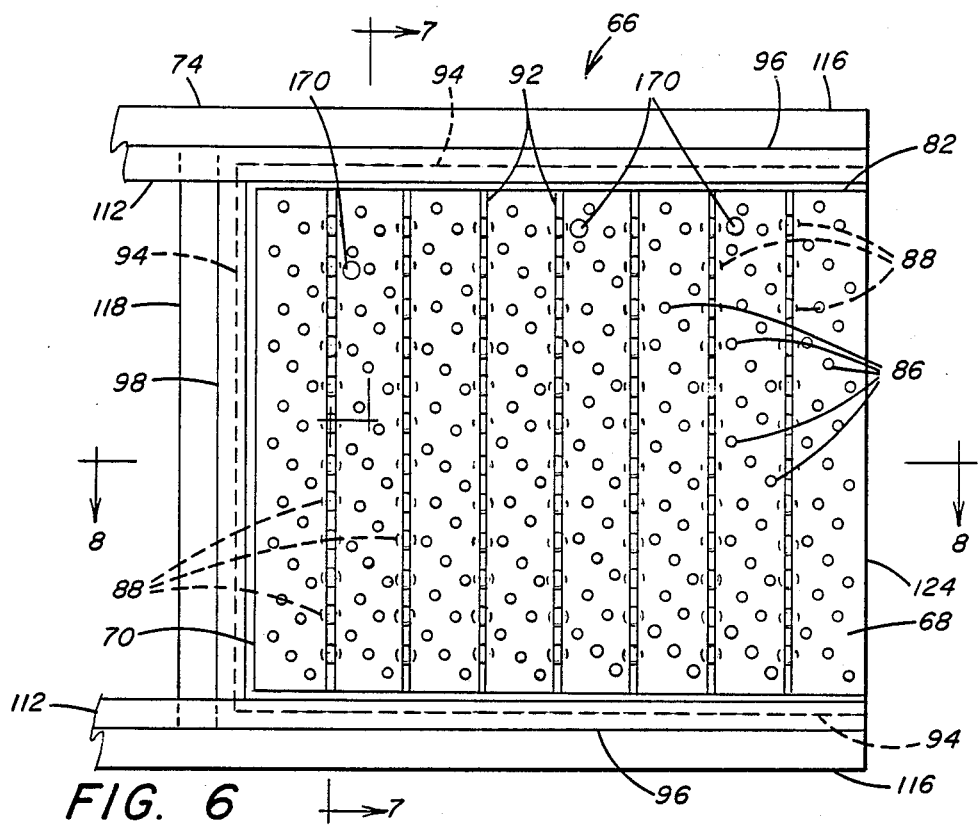
FIG. 6 is a view through line 6—6 of FIG. 3 illustrating the downwardly facing surface of the pick-up.
Figure 7:
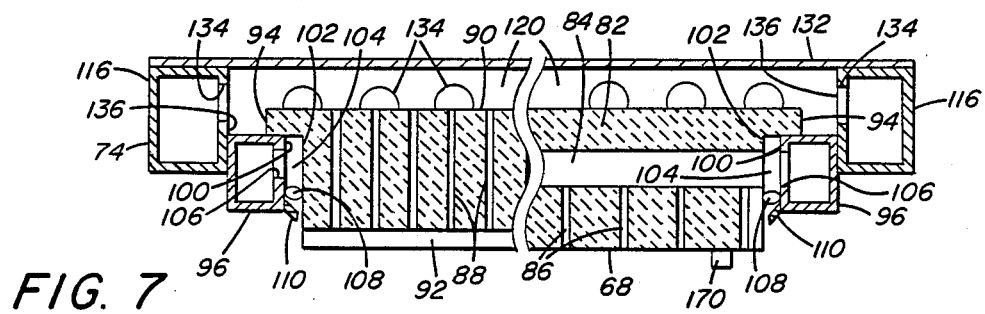
FIG. 7 is a view through line 7—7 of FIG. 6.
Figure 8:
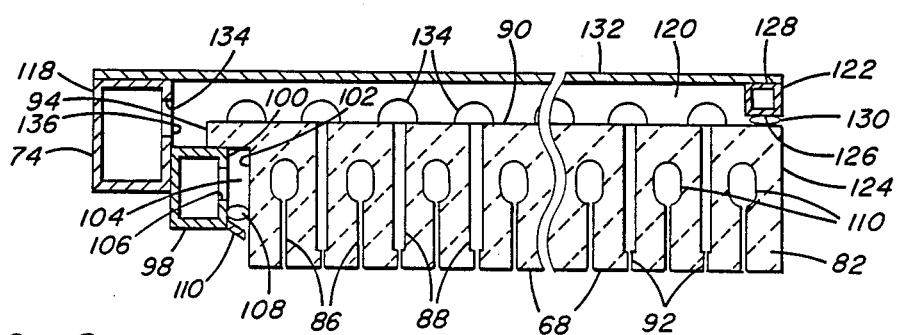
FIG. 8 is a view through line 8—8 of FIG. 6.

Although not limiting in the present invention, in the particular embodiment illustrated in FIGS. 6-8, the pick-up portion 70 includes a block 82 with a series of passageways 84 passing therethrough. The block 82 should be of a material that is dimensionally stable when subjected to repeated heating and cooling cycles. In the preferred embodiment of the invention, the block 82 is fused silica ceramic material. Pressure orifices 86 are cast in or drilled through the block 82 to provide a continuous conduit from the passageways 84 to the face 68. Vacuum orifices 88, which may be cast in or drilled through block 82, form a conduit between the face 68 and the back surface 90 of the block 82. In the particular embodiment illustrated in FIGS. 6-8, the vacuum orifices 88 include a generally circular hole extending from the back surface 90 to a point near the face 68. A longitudinally extending slot 92 connects all the vacuum orifices 88 along the same row so that vacuum drawn through the vacuum orifices 88, as will be discussed later, is drawn along a continuous slot rather than at discrete orifice openings. The slot 92 provides a greater vacuum area so that less vacuum is required to support the glass sheet, as will be discussed later.

Figure 4:
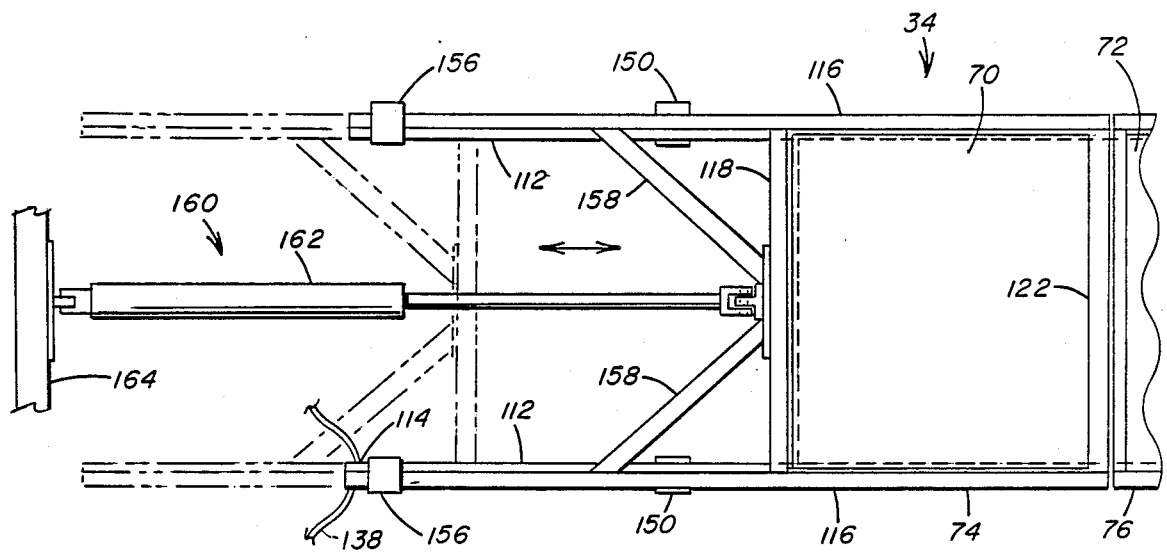
FIG. 4 is a detailed partial top view of the particular embodiment of the invention shown in FIGS. 1 and 2.

The block 82 includes a ledge portion 94 along three sides that rests on hollow longitudinally extending tube members 96 and cross tube member 98 of the slide assembly 74. The tubes 96 and 98 are assembled such that the hollow passages within the tubes are interconnected. Innerface 100 of tube members 96 and 98 is spaced from the peripheral surface 102 of the block 82 forming a chamber 104 therebetween so that the slide assembly 74 may expand and contract due to temperature variations while maintaining support of the block 82. The innerface 100 is also provided with openings 106 interconnecting the tube members 96 and 98 with the chamber 104. A sealing arrangement 108, for example, ceramic fiber rope, is inserted into the space between the block 82 and tubes 96 and 98 so as to seal the chamber 104. If required, a holder 110 may be used to maintain the rope 108 in place. Extension tube member 112 is connected to one or both of the longitudinally extending members 96 or the cross tube member 98 to provide a pressurized gas hookup 114 that is external to the furnace 20 as shown in FIG. 4. With this arrangement, there is a continuous conduit from the hookup 114 in the extension member 112, through the tube members 96 and 98, through the chamber 104, the passages 84, and pressure orifices 86 to provide pressurized gas from a pressurized gas source (not shown) to the face 68 of the block 82. It is preferred that the temperature of the pressurized gas be approximately the temperature of the glass sheet G to be supported so as to prevent any optical distortion due to cooling or overheating of the glass from the pressurized gas.

With continued reference to FIGS. 6-8, tube members 96 are secured to reinforcing tube members 116 and cross member 98 is secured to reinforcing cross member 118. As with tubes 96 and 98, the hollow passages within the members 116 and 118 are preferably interconnected. The members 116 and 118 are sized so as to extend above the tube members 96 and 98 and form a vacuum chamber 120 as will be discussed later. A fourth member 122 extends across the block 82 connecting opposing members 116 at the interfacing end 124 of the pick-up portion 70 such that the lower surface 126 is in close proximity to the back surface 90 of the block 82 and the upper surface 128 is coplanar with the upper surfaces of members 116 and 118. A sealing arrangement 130, for example, ceramic fiber rope, may be inserted between the back surface 90 and lower surface 126 of the member 122 to help seal the chamber 120. A cover plate 132 is secured to the members 116, 118 and 122 to form the chamber 120. Members 116 and 118 are provided with openings 134 in their inwardly facing wall 136 so that a continuous passageway is provided between a vacuum source (not shown) to the face 68 of the block 82 through tube members 116 and 118, vacuum chamber 120, and vacuum orifices 88, and a vacuum can be drawn along the face 68 of the block 82 by the vacuum source connected to the slide assembly 74 at vacuum hookup 138 as shown in FIG. 4. Although FIG. 4 illustrates a single hookup 138 at one of members 116, it is obvious that the hookup could be at the cross member 118 or that there may be multiple vacuum hookups. In the manner described, supra, both the vacuum and pressurized gas in the pick-up portion 70 are supplied through the frame of the slide assembly 74 so that any ducting required to provide the vacuum or pressurized gas to the pick up 70 may be maintained principally outside of the heated shaping station 24.

The vacuum is drawn through orifices 88 to draw the heat softened glass sheet towards the face 68 of the pick-up 66 while pressurized gas is provided through the pressure orifices 86 along the press face 68 to maintain a cushion of gas between the pick-up 66 and glass sheet G and position the glass in spaced relation from the face 68. The combination of vacuum and pressurized gas prevents direct contact between the upper major surface of the glass sheet G and the face 68 of the pick-up 66.

In one particular arrangement of the orifices for the pick-up 66, 5/16 inch (0.23 centimeters) diameter vacuum orifices 88 were positioned on ½ inch (1.27 centimeters) centers within a row, with the rows spaced at 1½ inches (3.81 centimeters) as shown in FIG. 6. A ⅛ inch wide × ⅛ inch deep (0.32 centimeters × 1.27 centimeters) slot 92 positioned along the face 68 along the center line of each row of orifices 88 interconnects the vacuum orifices 88 within the row to provide a continuous vacuum slot. The pressurized gas passageways 84 were placed at 1½ inches (3.81 centimeters) centers with 0.090 inches (0.23 centimeter) diameter pressure orifices 86 spaced at approximately ½ inch (1.27 centimeters) centers in an offset manner along the center line of the passageways 84 as show in FIG. 6. It is expected that the vacuum drawn through the vacuum orifices 88 will operate at an equivalent of approximately 0.3 inches to 1.3 inches (0.76 centimeters to 3.3 centimeters) of water column and the pressurized gas is supplied at an equivalent of approximately 0.2 inches to 3.0 inches (0.51 centimeters to 7.6 centimeters) of water column. By varying the pressure and vacuum parameters, the spacing between the upper surface of the glass sheet and the face 68 of the pick-up 66 may be varied. The spacing is preferably between 0.015 inch to 0.050 inch (0.038 centimeters to 0.13 centimeters). It should be noted that although the rows of pressure orifices 86 and vacuum orifices 88 extend parallel to the direction of glass travel as seen in FIGS. 2 and 6, these rows may also be oriented in a direction transverse to the glass sheet movement.

Figure 5:
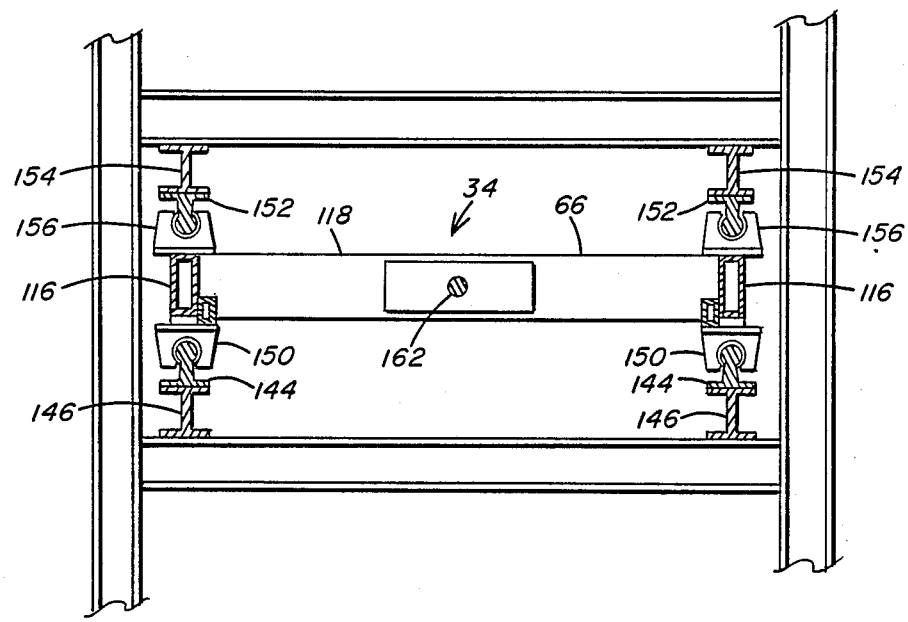
FIG. 5 is a view through line 5—5 of FIG. 3 illustrating the sliding rail support arrangement.

Reinforcing tube members 116 extend transversely outward from the shaping station 24 and are provided with a sliding rail arrangement 140 to move the sliding frame 74 and pick-up portion 70 into and out of the heated shaping station 24. As shown in FIGS. 3 and 5, the members 116 extend out from the shaping station 24 towards support structure 142. Rails 144 are supported on beam members 146 from column 148 of the support structure 142 and are slidably captured by lower rail collar 150 secured to members 116. Rails 152 are positioned above the sliding assembly 74 and supported by beams 154 from the columns 148. Upper rail collar 156 is secured to member 116 of the slide frame 74 and slidably captures rail 152. If required, additional upper or lower collars may be mounted on the members 116 and slidably secured to rails 144 or 152 as needed to provide the necessary stability and ease of sliding motion of the pick up portion 70 and slide assembly 74. Cross braces 158 secured to members 116 and cross members 118 reinforce the slide assembly 74.

In order to translate the sliding assembly 74 and the pick-up portion 70 supported thereon into and out from the shaping station 24, a drive assembly 160 is provided. In order to reduce cycle time in the transfer and subsequent shaping operation, the drive assembly 160 should be capable of moving the pick-up portion 70 in and out of the shaping station 24 in a time period of between 1 to 5 seconds. Although not limited in the present invention, in the particular embodiment illustrated in FIGS. 3 and 4, the drive assembly 160 is a linear actuator 162 secured at one end to cross member 118 of assembly 74 and at its opposite end to cross brace 164 of the support structure 142. In order to provide the necessary control and speed required, the linear actuator 162 is preferably a ball screw actuator with AC servo motor drives.

Referring to FIG. 1, the sheet transfer device 26 includes a tempering ring which may be positioned beneath the upper vacuum mold 36 after the glass sheet G is pressed between molds 36 and 38 to receive the shaped glass sheet and convey it to the shaping station 22 where it is rapidly cooled to provide a temper. The cooling station 22 includes a plenum 166 and nozzles 168 to direct cooling fluid at the major surfaces of the shaped glass sheet.

The glass sheet shaping arrangement described, supra, provides an apparatus whereby there is minimal contact between the glass sheet G and the transfer device 34 that delivers and positions the glass sheet at the shaping station 24. Other than the contact between the glass sheet edge and the stop members 170, edge locators 172, and/or positioning arm mechanisms (not shown), there is no contact between the heat softened glass sheet G and the pick-up 66. In addition, the arrangement allows the molds 32 to remain vertically aligned with one another throughout the transfer and shaping operation so that realignment of the molds 32 after each glass sheet is shaped will not be required. Furthermore, this arrangement eliminates additional equipment that would be necessary to move and align the molds 32 during the shaping operation.

The following describes the preferred operating sequence of the present invention as illustrated in FIGS. 9–24.

In operation, glass sheets G pass serially through the furnace 20 which heats the glass sheets G to their heat softening temperature as shown in FIGS. 9 and 10. As a glass sheet G passes the sensing mechanism 30, it initiates a glass transfer and timing sequence. The glass sheet G is conveyed off of the last conveyor roll 28 to the pick-up 66. The pick-up 66 is in a closed position as shown in FIGS. 11 and 12. Both vacuum and pressurized gas are provided along the face 68 of the pick-up 66 as described, supra, to support the glass sheet G in non-contacting engagement. Since the glass sheet G does not contact the face 68 of the pick-up 66, there is virtually no friction therebetween and the glass sheet G floats below the face 102. The inertia of the glass sheet G as it is being conveyed off of the rolls 28 and below the pick-up 66 is sufficient to propel the glass sheet G downstream along the pick-up 66 and into contact with stop members 170, which are positioned on the face 68 of the pick-up 66 and are used to locate the glass sheet thereon. If required, edge locators 172 (shown in FIG. 1 only) or arm mechanisms (not shown) may be used to help move the glass into contact with the stop members 170 as well as position the glass sheet G on the pick-up 66 and prevent it from bouncing off of the stop members 170 after contacting them.

In order to reduce cycle time of the glass sheet transfer onto the pick-up 66 and into the shaping station 24, the last set of rolls 28 may include a high speed run out section initiated by a timer activated by the sensing mechanism 30 to accelerate the glass sheet towards the pick-up 66. This acceleration may also impart additional inertial force to the glass sheet G to move it along the pick-up 66.

Referring to FIGS. 9–14, while the glass sheet G is being transferred to the pick-up 66, the molds 36 and 38 are in an open position with the pick-up 66 in a closed position therebetween. When the glass sheet G is aligned on the pick-up 66, the glass sheet G is deposited onto the press face 54 of the lower mold 38, which is positioned below the pick-up 66 as shown in FIGS. 13 and 14. Actuator 162 (shown in FIGS. 3 and 4) thereafter moves the pick-up portions 70 and 72 in opposite directions out of the heated shaping station 24 as shown in FIGS. 15 and 16. It should be appreciated that the glass sheet G can be deposited by either termination of the vacuum in the pick-up 66 or by splitting the pick-up 66 into two portions.

Figure 17:
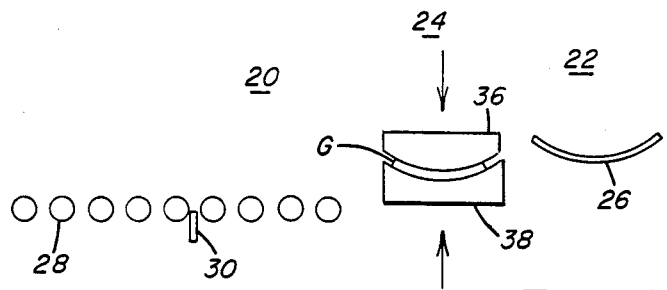
Figure 18:
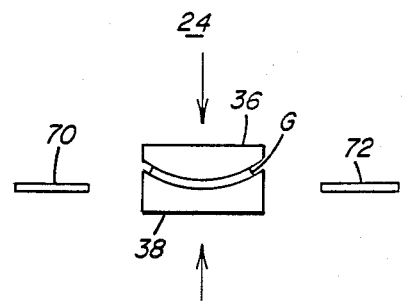

After the actuator 162 has removed the pick-up portions 70 and 72, upper piston 52 (see FIG. 1) moves upper mold 36 downward and/or lower piston 64 (see FIG. 1) moves lower mold 38 upward to sandwich the heat softened glass sheet therebetween as shown in FIGS. 17 and 18. After shaping is complete, the molds 36 and 38 retract to their original positions as shown in FIGS. 19 and 20 with the shaped glass sheet G held by vacuum against the press face 40 of the upper vacuum mold 36.

Figure 19:
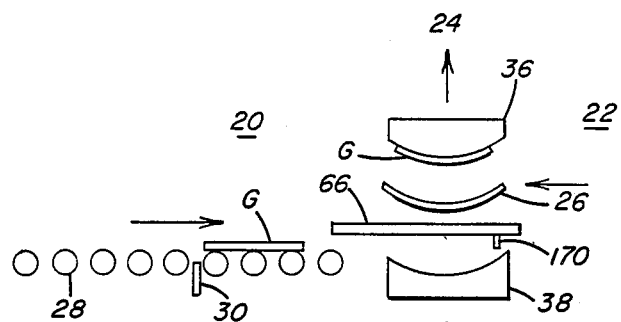
Figure 20:
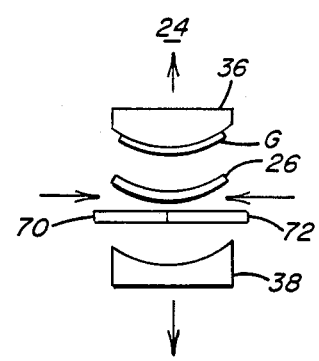
Figure 21:
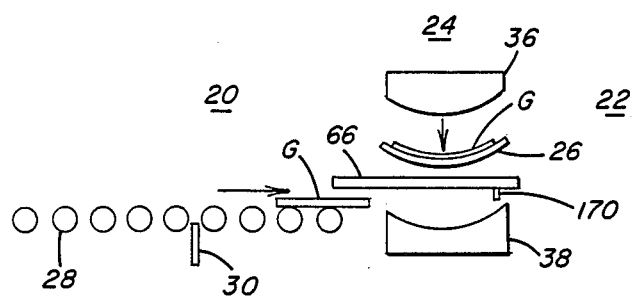
Figure 22:
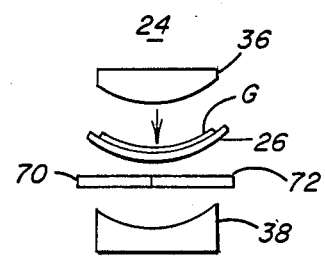
Figure 23:
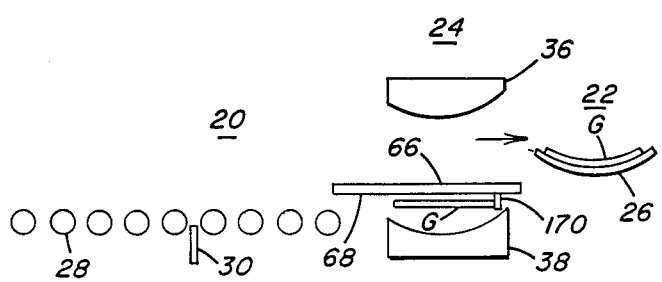
Figure 24:
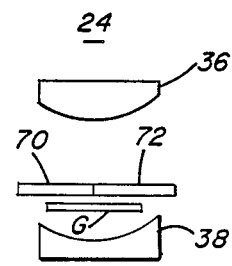

Tempering ring 26 is then moved below the upper mold 36 as shown in FIGS. 19 and 20 to receive the shaped glass sheet G when vacuum in the upper mold 36 is terminated as shown in FIGS. 21 and 22. Tempering ring 26 conveys the glass sheet G to the cooling station 22 where it is rapidly cooled to impart a temper as shown in FIGS. 23 and 24.

Referring to FIGS. 21–24, after the molds 36 and 38 retract to their original positions and while tempering ring 26 is being positioned to receive the glass sheet G, linear actuators 162 move the pick-up portions 70 and 72 back into the heated shaping station 24 to their original closed positions to receive the next heat softened glass sheet G.

Figure 25:
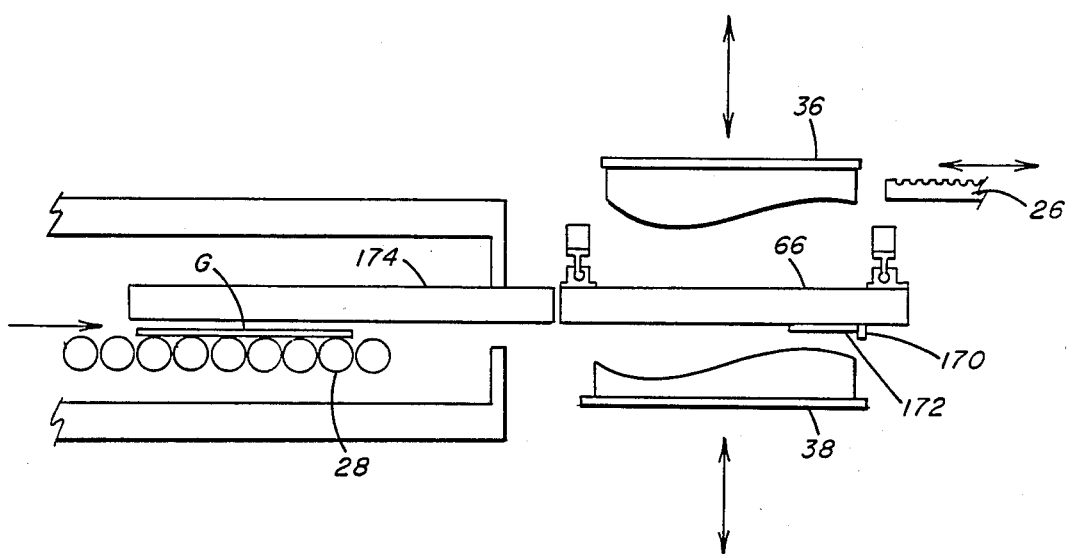
FIG. 25 is an elevational view of a different embodiment of the present invention.

It is contemplated that certain modifications or changes may be made to enhance the present invention. For example, referring to FIG. 25, a stationary vacuum/pressure pick-up 174 may be positioned between the furnace conveyor rolls 28 and the splitting vacuum pick-up 66. Since there is virtually no friction between a supported glass sheet G and a vacuum/pressure pick-up, the glass sheet G can be conveyed at a fast rate and in non-contacting engagement along the stationary vacuum/pressure pick-up 174 to further decrease the cycle time. In addition, the stationary vacuum/pressure pick-up 174, as well as the splitting vacuum/pressure pick-up 66, may be tilted downward in the downstream direction so as to further facilitate transfer of the glass sheet G into the shaping station 24.

Another contemplated modification would include a one piece vacuum/pressure pick-up rather than a splitting pick-up. After supporting, positioning and depositing the heat softened glass sheet between the molds 32, the one piece pick-up would shuttle out from between the molds 32 in a direction transverse to the direction is which the glass sheets are conveyed or in an upstream direction into the furnace along the furnace's longitudinal centerline, so that the molds 32 can move towards each other and shape to heat softened glass sheet. It is obvious that if the cooling station was positioned to the side of the shaping station rather than in-line with it, the pick-up could shuttle downstream along the furnace centerline to remove itself from between the molds 32.

In addition, it is further contemplated that the supporting surface 68 of the vacuum/pressure pick-up 66 may be contoured so as to impart an initial contour to the heat softened glass sheets prior to shaping between the molds 32.

The form of the invention shown and described in the specification represents a preferred embodiment thereof. It is understood that various changes or modifications may be made without departing from the spirit of the invention as defined in the claimed subject matter which follows.

We claim:

1. An apparatus for shaping a glass sheet comprising:
   means to heat said glass sheet to its heat softening temperature;
   a shaping station including vertically aligned mold means;
   a shuttling vacuum/pressure pickup with a downwardly facing glass sheet supporting surface;
   means to move said pickup from between a first position between said aligned mold means to a second position adjacent said mold means;
   means to transfer said heated glass sheet from said heating means to said shuttling vacuum/pressure pickup;
   means to support said glass sheet from said pickup including means to direct pressurized gas to said supporting surface and means to draw a vacuum along said supporting surface such that said pickup supports said heat softened glass sheet by vacuum from above while said pressurized gas prevents contact between said glass sheet and said supporting surface;
   means to deposit said sheet from said pickup to between said mold means while said pickup is at said first position; and
   means to shape said glass sheet between said aligned mold means.

2. The apparatus as in claim 1 wherein said pressurized gas directing means includes a first set of openings extending from said supporting surface through said pick-up to a pressurized gas chamber and said vacuum drawing means includes a second set of openings extending from said supporting surface through said pick-up to a vacuum chamber.

3. The apparatus as in claim 2 wherein selected ones of said second set of openings are interconnected by a slot extending along said pick-up supporting surface.

4. The apparatus as in claim 2 wherein said shuttling pick-up is a splitting vacuum/pressure pick-up with first and second portions and said moving means includes means to move said first and second portions in different directions.

5. The apparatus as in claim 4 wherein said moving means moves said first and second portions in opposite directions.

6. The apparatus as in claim 4 wherein said first and second pick-up portions each include a shuttling frame with said pick-up portion supported therefrom.

7. The apparatus as in claim 6 wherein each of said frames include a first set of interconnected support tubes having a first enclosed passageway and means to connect said first passageway with said first set of openings in said pick-up and a second set of interconnecting support tubes having a second enclosed passageway and means to connect said second passageway with said second set of openings, wherein said pressurized gas is supplied through said first passageway of said frame and said vacuum is drawn through said second passageway of said frame.

8. The apparatus as in claim 7 further including means to couple said first set of tubes with a pressurized gas source and means to couple said second set of tubes with a vacuum source wherein said coupling means are external to said shaping station.

9. The apparatus as in claim 6 further including means to align and position said heat softened glass sheet on said pick-up.

10. The apparatus as in claim 9 wherein said heating means is a furnace including means to convey said glass sheets therethrough and further wherein said pick-up is positioned adjacent to and extends downstream from said furnace with said supporting surface located slightly above the upper major surface of said glass sheet as said sheet is conveyed through said furnace, and said transfer means includes means to convey said heat softened glass sheet into supporting engagement with said pick-up.

11. The apparatus as in claim 10 wherein said shuttling pick-up partially overlaps said conveying means of said furnace.

12. The apparatus as in claim 10 wherein said first and second pick-up portions move perpendicular to the direction in which said glass sheet is conveyed through said furnace.

13. The apparatus as in claim 12 wherein said vertically aligned mold means includes a pair of vertically aligned upper and lower shaping molds with full surface press faces wherein said first position of said pick-up is between said upper and lower molds.

14. The apparatus as in claim 13 further including a cooling station positioned downstream from said shaping station and means to transfer shaped glass sheets from said shaping station to said cooling station.

15. The apparatus as in claim 14 wherein said upper mold is a full face vacuum mold and said shaped glass sheet transfer means includes a tempering ring movable from said cooling station to a position between said molds and beneath said shaped sheet in said shaping station when said molds are in a separated position.

16. The apparatus as in claim 12 wherein said lower surface of said pick-up is contoured to initially deform said glass sheet.

17. The apparatus as in claim 10 wherein said transfer means further includes a stationary vacuum/pressure pick-up positioned between said furnace and said shuttling pick up and further including means to convey said heat softened glass sheet in non-contacting engagement beneath said stationary pick-up to said shuttling pick-up.

18. A method of shaping a glass sheet comprising:
heating said glass sheet to its heat softening temperature;
positioning a movable holder at a first position between vertically aligned mold means;
transferring said heat softened sheet to said movable holder while said holder is at said first position;
supporting said heat softened glass sheets from above with said holder in substantially non-contacting engagement therewith;
depositing said glass sheet at said mold means;
moving said holder from said first position between said mold means to a second position adjacent to said mold means; and
shaping said glass sheet between said mold means.

19. The method as in claim 18 wherein said supporting step includes drawing a vacuum through a downwardly facing surface of said holder while providing pressurized gas along said surface such that said vacuum draws said heat softened glass sheet towards said holder to support said glass sheet while said pressurized gas maintains a cushion of gas between the upper major surface of said glass sheet and said surface of said holder so that non-contacting engagement is maintained between said glass sheet and said holder to support said glass sheet.

20. The method as in claim 19 wherein said holder includes first and second portions forming said downwardly facing shaping surface and wherein said moving step includes moving said portions of said holder in different directions.

21. The method as in claim 19 wherein said moving step includes splitting said holder into two holder portions and moving each of said portions in opposite directions.

22. The method as in claim 21 wherein said heating step includes conveying said glass sheet through a heating cavity.

23. The method as in claim 22 wherein said moving step further includes moving each of said holder portions perpendicular to the direction of glass sheet movement into said shaping station.

24. The method as in claim 22 further including the step of aligning said heat softened glass sheet on said holder prior to said depositing step.

25. The method as in claim 24 wherein said depositing step includes terminating said vacuum in said holder.

26. The method as in claim 25 wherein said transferring step includes positioning said facing surface of said holder slightly above and adjacent to the end of said heating cavity and conveying said heat softened glass sheet directly into non-contacting engagement with said holder.

27. The method as in claim 26 wherein said vertically aligned mold means includes a pair of vertically aligned upper and lower shaping molds and said first position is between said molds and further wherein said shaping step includes pressing said heat softened glass sheets between said upper and lower shaping molds.

28. The method as in claim 27 wherein said upper mold is a vacuum mold and including the steps of maintaining engagement of said shaped glass sheet with said upper mold after said shaping step, transferring said shaped glass sheet to a tempering ring, moving said tempering ring with said shaped glass sheet supported thereon to a cooling station and cooling said shaped glass sheet.

29. The method as in claim 25 wherein said transferring step includes positioning a stationary holder having a planar downwardly facing support surface adjacent to and extending downstream from said heating cavity such that said support surface is slightly above the upper major surface of said glass sheet as said sheet is conveyed through said cavity, drawing a vacuum through said support surface while providing pressurized gas along said support surface wherein said vacuum draws said heat softened glass sheet towards said stationary holder to support said glass sheet while said pressurized gas maintains a cushion of gas between said glass sheet and said support surface such that said glass sheet is in non-contacting engagement with said stationary holder, positioning said movable holder adjacent to and downstream from said stationary holder such that said downwardly facing surface of said movable holder is coplanar with said support surface of said stationary holder, conveying said glass sheet from said heating cavity into non-contacting engagement with said stationary holder, and conveying said glass sheet into non-contacting engagement with said movable holder.

30. The method as in claim 29 wherein said conveying steps include providing sufficient force to said glass sheet as said glass sheet is transferred from said heating cavity to said stationary holder such that said glass sheet floats beneath said stationary pick-up, in a downstream direction, to beneath said movable holder.

* * * * *